Feb. 20, 1934.  E. M. CROSLAND  1,948,440
OVEN FOR BAKING
Filed Feb. 6, 1933
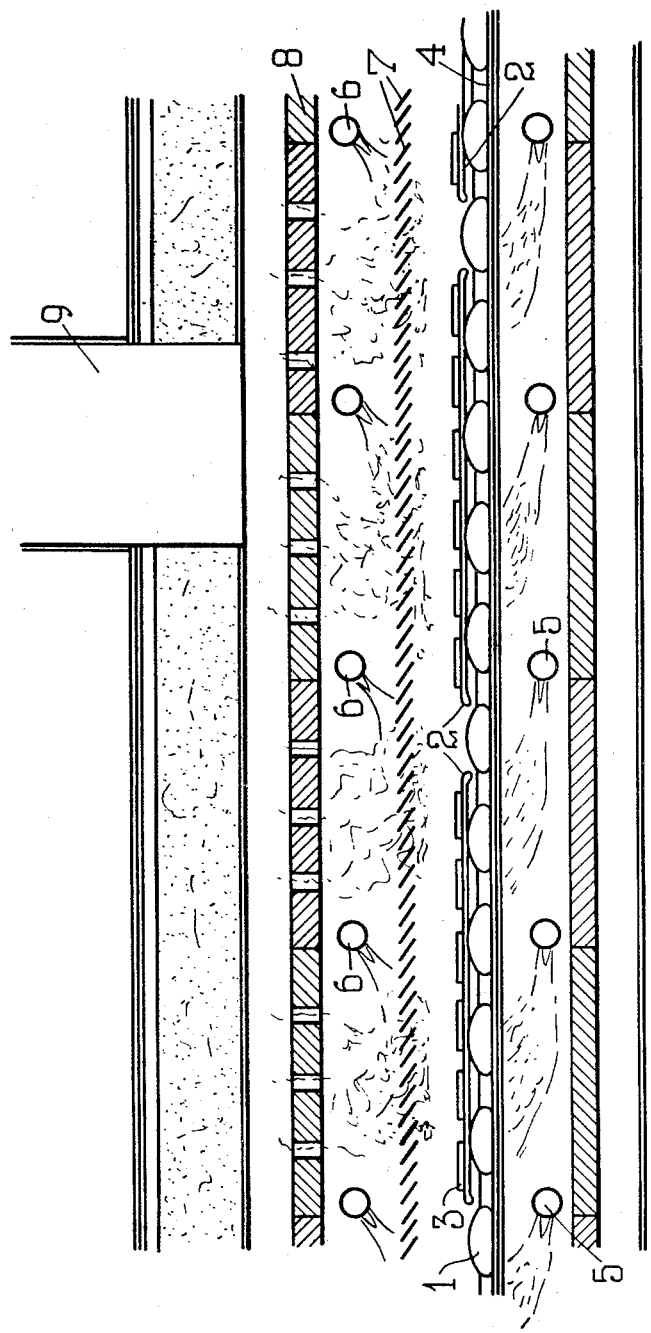
Inventor:
Edward Milner Crosland,
By
Attorneys.

Patented Feb. 20, 1934

1,948,440

UNITED STATES PATENT OFFICE 1,948,440

OVEN FOR BAKING

Edward Milner Crosland, Earlestown, Newton-le-Willows, England, assignor to T. & T. Vicars Limited, Earlestown, Newton-le-Willows, England, a British company Application February 6, 1933, Serial No. 655,532, and in Great Britain July 30, 1932

1 Claim. (Cl. 107—57)

The present invention relates to ovens of the tunnel type for baking biscuits and the like goods but also useful for other baking operations where the goods to be baked are conveyed between heating elements of the combustion type, such as oil burners or gas burners. The invention is particularly applicable to ovens used in the manufacture of biscuits, cakes and the like, but it may also be used for such processes as annealing, drying and lacquering. For the purposes of this description the baking of biscuits only will be alluded to.

It is very important that goods to be baked in a baking chamber shall be subjected to heat without any atmospheric disturbances, and also that the heat shall be even and without variation across the width of the oven or chamber.

When the heat is supplied by burners, these conditions are difficult to attain because the combustion of gas necessarily creates streams of very high temperature products of combustion which have a definite direction of flow and intense local heat. If these high temperature products of combustion impinge directly on to the surface of the goods a scorching of the surface may take place before any real penetration of heat occurs.

The covering over of the bottom burners by sheet metal or the like material, as a means of preventing the hot gases arising from the bottom burners, is known. Also perforated plates have been inserted between the bottom burners and the goods being baked to act as a diffusion medium. The total exclusion of the hot products of combustion from the baking chamber, is however, not usual on account of the large heat losses which are entailed thereby. A further objection to the exclusion of the burners from the baking chamber is that difficulties arise in absorbing the steam and gases that emanate from the goods themselves whilst being heated, and it is usual to allow the steam to mingle with the products of combustion and be taken away together along the oven flues.

It is also known to provide a false roof for a baking chamber between which and the roof itself burners are arranged, this false roof being perforated and ribbed or roughened to form a grid capable of radiating heat.

According to the present invention louvred sheet metal heat radiating elements are interposed between the goods to be baked and burners directed against the opposite sides of said louvred sheets, which allow the free passage therethrough of steam or gas escaping from the baking chamber but yet present a complete radiation surface.

The invention is more particularly described with reference to the accompanying drawing showing an improved baking oven in cross-sectional elevation.

The baking oven includes the usual chain conveyor 1 upon which pans 2 carrying the goods 3 are supported. The chain conveyors 1 pass over a perforated floor plate 4 through which gases from burners 5 situated below the floor plate can pass for the baking of the goods. Hot gases from a second set of burners 6 arranged above the goods impinge on perforated or louvred plates 7, which extract heat from hot products of combustion and radiate this down on to the goods passing below without however, interfering with the free passage of the steam rising from the goods to be baked, and together with the products of combustion can escape through the perforated tiled roof 8 of the baking chamber and into the flue 9.

I declare that what I claim is:—

In a baking oven, a false perforated roof located within the oven and spaced from the top thereof, a false floor plate located within the oven and spaced from the bottom thereof, a louvred metal sheet located between said false perforated roof and said false floor plate, means for carrying the goods to be baked through the space between said louvred metal sheet and said false floor plate, a series of heating devices located in the space below said false floor plate, and an additional series of heating devices located in the space between said false perforated roof and said louvred metal sheet.

EDWARD MILNER CROSLAND.